(12) United States Patent
Shen et al.

(10) Patent No.: US 7,809,833 B2
(45) Date of Patent: Oct. 5, 2010

(54) ASYMMETRIC DYNAMIC SERVER CLUSTERING WITH INTER-CLUSTER WORKLOAD BALANCING

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 12/173,057

(22) Filed: Jul. 15, 2008

(65) Prior Publication Data

US 2010/0017460 A1    Jan. 21, 2010

(51) Int. Cl.
G06F 15/173 (2006.01)
G06F 9/46 (2006.01)

(52) U.S. Cl. .................. 709/226; 709/240; 718/101; 718/105

(58) Field of Classification Search ............ 709/226, 709/231–236, 238–242; 718/101–105
See application file for complete search history.

(56) References Cited

U.S. PATENT DOCUMENTS

| | | | |
|---|---|---|---|
| 6,418,477 B1 * | 7/2002 | Verma ................ | 709/240 |
| 7,068,612 B2 * | 6/2006 | Berkcan et al. ......... | 370/252 |
| 7,111,019 B1 * | 9/2006 | Nishizawa et al. ........ | 1/1 |
| 2003/0120699 A1 * | 6/2003 | Hostetter et al. ........ | 709/101 |
| 2005/0091344 A1 | 4/2005 | Chen et al. | |
| 2006/0236324 A1 * | 10/2006 | Gissel et al. ........... | 718/105 |
| 2007/0220516 A1 * | 9/2007 | Ishiguro et al. ......... | 718/101 |
| 2008/0120359 A1 * | 5/2008 | Murakami ............. | 709/201 |

OTHER PUBLICATIONS

Improving I/O Performance of Clustered Storage Systems by Adaptive Request Distribution Wu, C.; Burns, R.; High Performance Distributed Computing, 2006 15th IEEE International Symposium on Digital Object Identifier:10.1109/HPDC.2006.1652152 Publication Year: 2006, pp. 207-217.*

A Dynamic Metadata Equipotent Subtree Partition Policy for Mass Storage System Gongye Zhou; Qiuju Lan; Jincai Chen; Frontier of Computer Science and Technology, 2007. FCST 2007. Japan-China Joint Workshop on Digital Object Identifier: 10.1109/FCST.2007.6 Publication Year: 2007, pp. 29-34.*

(Continued)

*Primary Examiner*—Wing F Chan
*Assistant Examiner*—Razu A Miah
(74) *Attorney, Agent, or Firm*—Rabin & Berdo, PC; James R. Nock

(57) ABSTRACT

A method, computer program product or computer system for selecting a target data server from a plurality of data servers in an information system to service a request of a client with a data quality requirement, includes determining a formalized data quality of the client using the data quality requirement, using the formalized data quality of the client and finding a cluster of data servers from the plurality of data servers that can meet the data quality requirement of the client, choosing a select data server from the cluster of data servers, verifying if the select data server can still meet the data quality requirement of the client, and if so, selecting the select data server as the target data server for processing the request, and if not, selecting another data server as the target data server for processing the request.

23 Claims, 12 Drawing Sheets

OTHER PUBLICATIONS

A Dynamic Metadata Equipotent Subtree Partition Policy for Mass Storage System Gongye Zhou; Qiuju Lan; Jincai Chen; Frontier of Computer Science and Technology, 2007, FCST 2007, Japan-China Joint Workshop on Digital Object Identifier: 10.1109/FCST.2007.6 Publication Year: 2007, pp. 29-34.*

Improving I/O Performance of Clustered Storage Systems by Adaptive Request Distribution Wu, C.; Burns, R.; High Performance Distributed Computing, 2006 15th IEEE International Symposium on Digital Object Identifier: 10.1109/HPDC.2006.1652152 Publication Year: 2006, pp. 207-217.*

Alexandros Labrinidis et al., "Quality Contracts for Real-Time Enterprises," Business Intelligence for the Real-Time Enterprises, First National Workshop, Birte 2006, Revised Selected Papers, Springer-Verlag Berlin, Germany, 2007, pp. 143-156.

* cited by examiner

| Row | Client (data quality) | Selected Server | Server 1 | Server 2 | Server 3 | Server 4 | Server 5 |
|---|---|---|---|---|---|---|---|
| 1 | | | 0, 60% | 2, 70% | 8, 55% | 6, 72% | 12, 65% |
| 2 | Client 1 (5) | Server 1 | 0, 72% | 2, 70% | 8, 55% | 6, 72% | 12, 65% |
| 3 | Client 21 (20) | Server 3 | 0, 72% | 2, 70% | 8, 68% | 6, 72% | 12, 65% |
| 4 | Client 3 (7) | Server 2 | 0, 72% | 2, 75% | 8, 68% | 6, 72% | 12, 65% |
| 5 | Client 4 (50) | Server 5 | 0, 72% | 2, 75% | 8, 68% | 6, 72% | 12, 72% |
| 6 | Client 5 (10) | Server 3 | 0, 72% | 2, 75% | 8, 76% | 6, 72% | 12, 72% |

FIG. 4

ASYMMETRIC DYNAMIC SERVER CLUSTERING WITH INTER-CLUSTER WORKLOAD BALANCING

BACKGROUND

1. Technical Field

The present invention relates to server clustering. More specifically, it relates to asymmetric data-quality based dynamic server clustering with a workload management technique to balance inter-cluster workloads of servers.

2. Background Information

Many enterprise information systems use data centers that include a large number of data servers located in multiple geographical locations to maintain their data. These information systems typically assume that these data servers are stateless servers, which treat each request as an independent transaction unrelated to any previous request, or static servers connected to the same back-end databases. Under these assumptions, all data servers have exactly the same functions with identical qualities, which makes it hard for an information system to provide data with required data quality, and also makes it hard to scale.

Data in an enterprise information system may be stored in many copies in different places. For a system that works for millions of clients, and effectively responds to data accesses from different geographical locations, multiple active copies of the same data must be maintained to be current and consistent, and the time window in which the data are not current should be minimized. Since it usually takes time for a transaction data to be replicated from a master server to all replicated servers across geographical locations, different replicated servers in the enterprise system may have different lags. Moreover, transactions are committed every second in an enterprise system. Hence, lags on replicated servers change dynamically, depending on transaction rate, network traffic, geographic distance, or replication server capacities, etc. On the other hand, different clients may have different data quality requirements. For example, FIG. 1 illustrates five servers and three clients in an exemplar enterprise information system. At the moment as shown in FIG. 1, server 1 (101) is a server with a transaction lag of 0, server 120 (102) has a transaction lag of 50, server 260 (103) has a transaction lag of 19, server 800 (104) has a transaction lag of 1200, and server 960 (105) has a transaction lag of 1. At the same time, client 1 (106) has a data quality requirement of a lag of no more than 100 transactions. The data quality requirement of client 2 (107) is a lag of no more than 30 transactions, and the data quality requirement of client 3 (108) is a lag of no more than 1 transaction. Stateless or static severs cannot provide good performance if used in this system. For example, server 800 (104) should not be selected to service client 1 (106) because it cannot provide required data quality. Similarly, server 120 (102) cannot service client 2 (107).

The data quality problem can be further complicated by the ever-changing workloads of the servers in an enterprise information system. Typically, all clients want to access the server with best data quality, which may cause an overload of the server. And all clients attempt to avoid the server with the worst data quality, which may bring an underload to the server.

Data in an enterprise information system cannot be simply cloned to different data servers if the system must guarantee data quality, which makes the system difficult to scale. It is common that, in an enterprise system that stores multiple copies of the same data on different servers, some copies of the data are not current. Therefore, although a conventional enterprise system uses multiple data centers to keep the active copies of the same data, it seldom uses these copies to service clients because of the lack of confidence in the data quality. Most replicated data centers are only for failover or for disaster recovery purposes. However, since a failover or a disaster happens rarely, 99% of the time these replicated data centers are idle, thus resulting in a huge waste of resources.

Many enterprise information systems use clusters to enhance availability, scalability, and performance of their information systems. Most clusters assume that their constituent servers are stateless or static servers, and the clusters thus become symmetric. Symmetric clusters cannot guarantee to service different clients timely, without overloading or underloading the servers in the clusters.

SUMMARY

A method, computer program product or computer system for selecting a target data server from a plurality of data servers in an information system to service a request of a client with a data quality requirement, includes determining a formalized data quality of the client using the data quality requirement, using the formalized data quality of the client and finding a cluster of data servers from the plurality of data servers that can meet the data quality requirement of the client, choosing a select data server from the cluster of data servers, verifying if the select data server can still meet the data quality requirement of the client, and if so, selecting the select data server as the target data server for processing the request, and if not, selecting another data server as the target data server for processing the request.

BRIEF DESCRIPTION OF DRAWINGS

FIG. 4 shows the snapshots of the workloads of the servers, which illustrate how the workload management method works.

DETAILED DESCRIPTION

Figure 1:
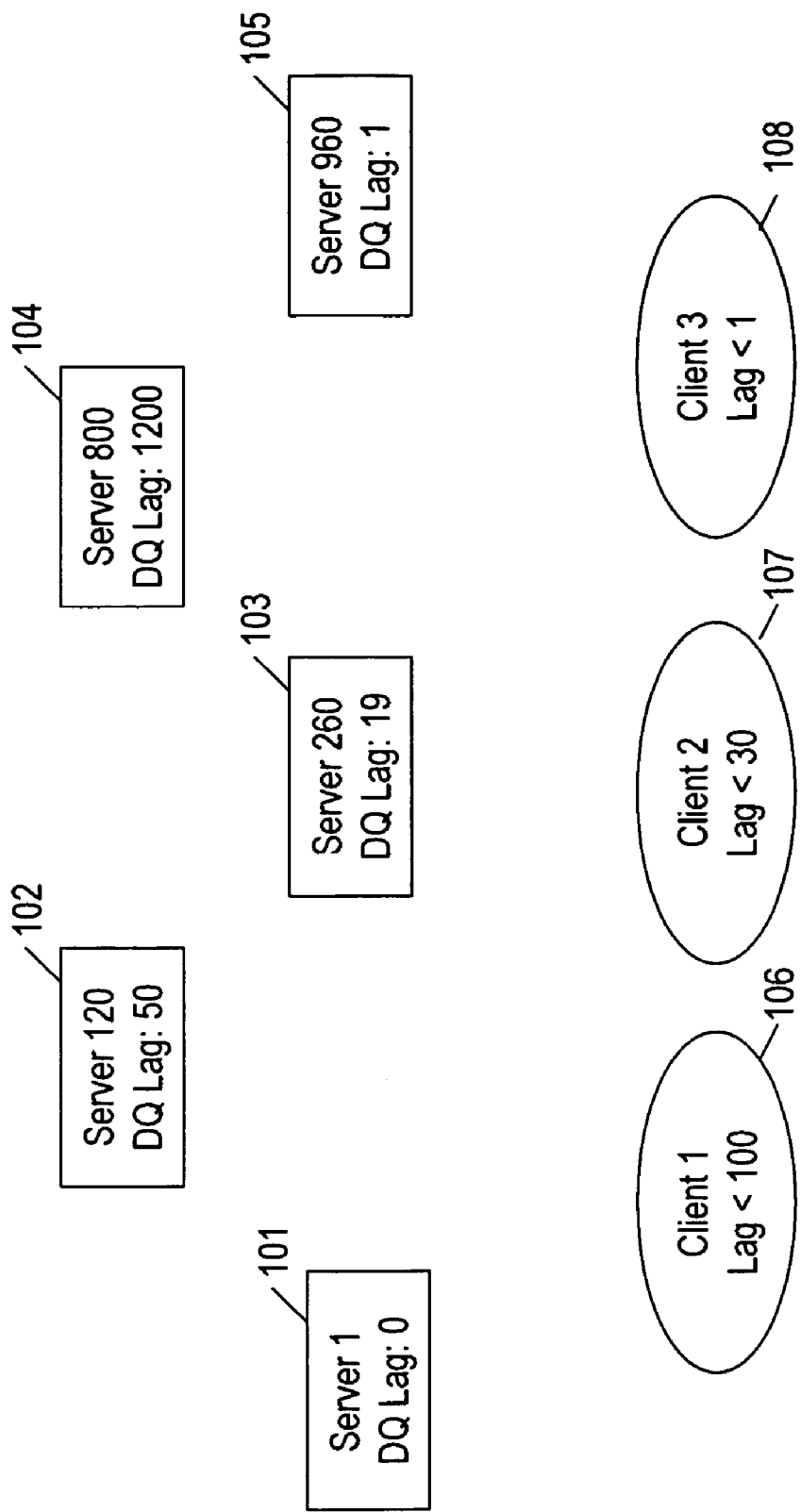
FIG. 1 illustrates five servers and three clients in an exemplar enterprise information system.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention enables a dynamic clustering of servers to service clients of different data quality requirements. A new workload management technique balances the workloads of servers within the clusters of servers.

Figure 2:
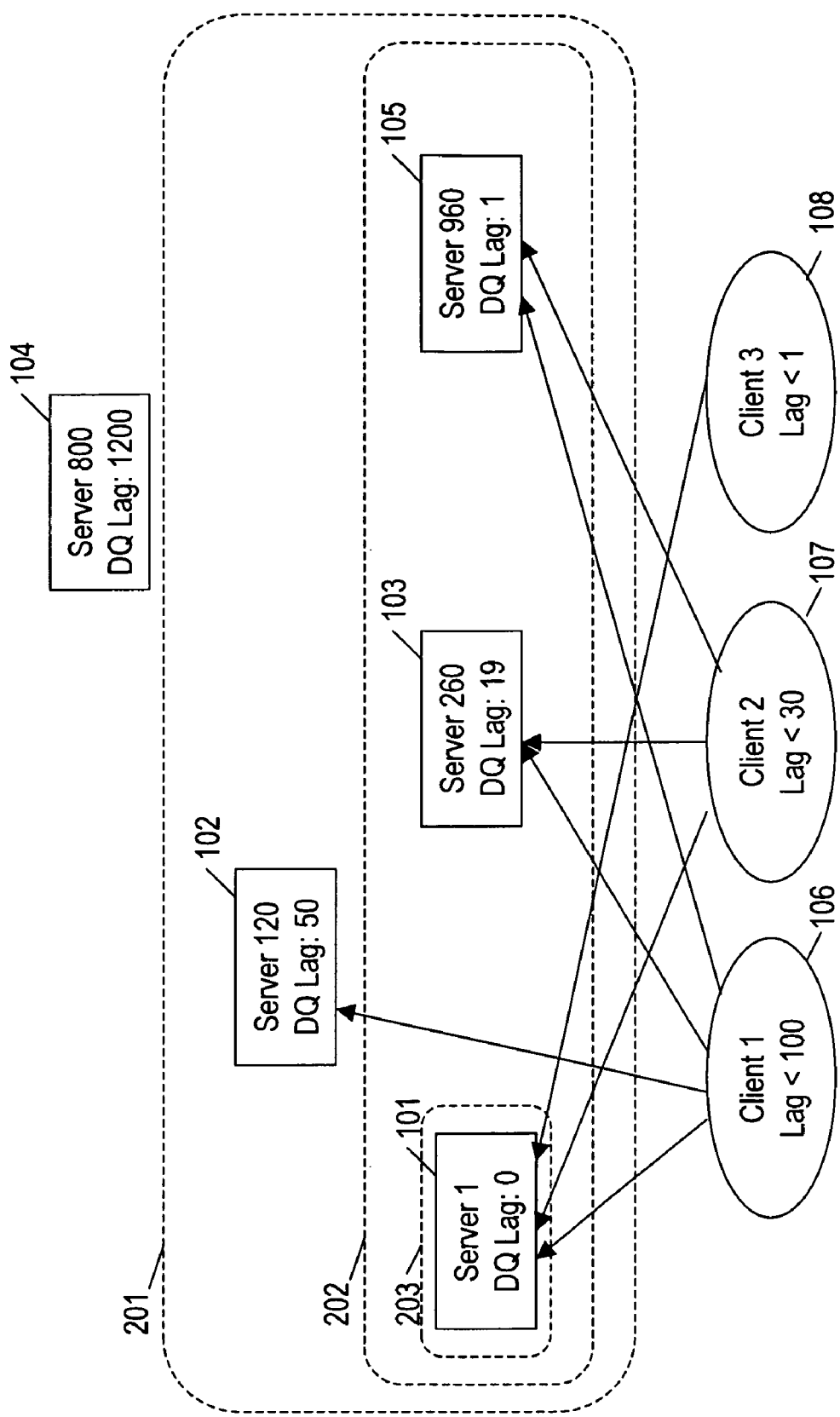
FIG. 2 is a conceptual diagram that illustrates how the present invention manages the five servers to service the three clients of different data quality requirements in FIG. 1.

FIG. 2 is a conceptual diagram that illustrates how the present invention manages the five servers to service the three clients of different data quality requirements in FIG. 1. In one embodiment of the present invention, clusters of the servers are formed to service different clients. For example, client 3 (108) has a data quality requirement of a lag of no more than 1 transaction. The only server that can meet this requirement is server 1 (101). Hence, a cluster (203) that includes server 1 (101) is formed to service client 3. For client 2 (107) that requires a lag of no more than 30 transactions, either server 1 (101), server 260 (103) or server 960 (105) can be selected.

Thus, a cluster (202) that includes server 1 (101), server 260 (103) and server 960 (105) are created to service client 2 (107). Similarly, a cluster (201) of server 1 (101), server 120 (102), server 260 (103) and server 960 (105) can be formed to service client 1 (106) that requires a lag of no more than 100 transactions. The present invention enables a workload management method to select a server in each of the clusters to service the client of the cluster, so as to effectively service the client, and to prevent the servers from overloading or underloading. For example, server 1 (101) is included in the clusters for all three clients, and, because it has no lag, all clients may want to select this server to service them. Nevertheless, the present invention may select server 1 (101) to service client 3 (108), and select server 260 (103) and server 960 (105) to service client 1 (106) and client 2 (107), respectively. Therefore, all clients are serviced in a timely manner, and server 1 (101) is not overloaded by servicing requests from all three clients.

Figure 3:
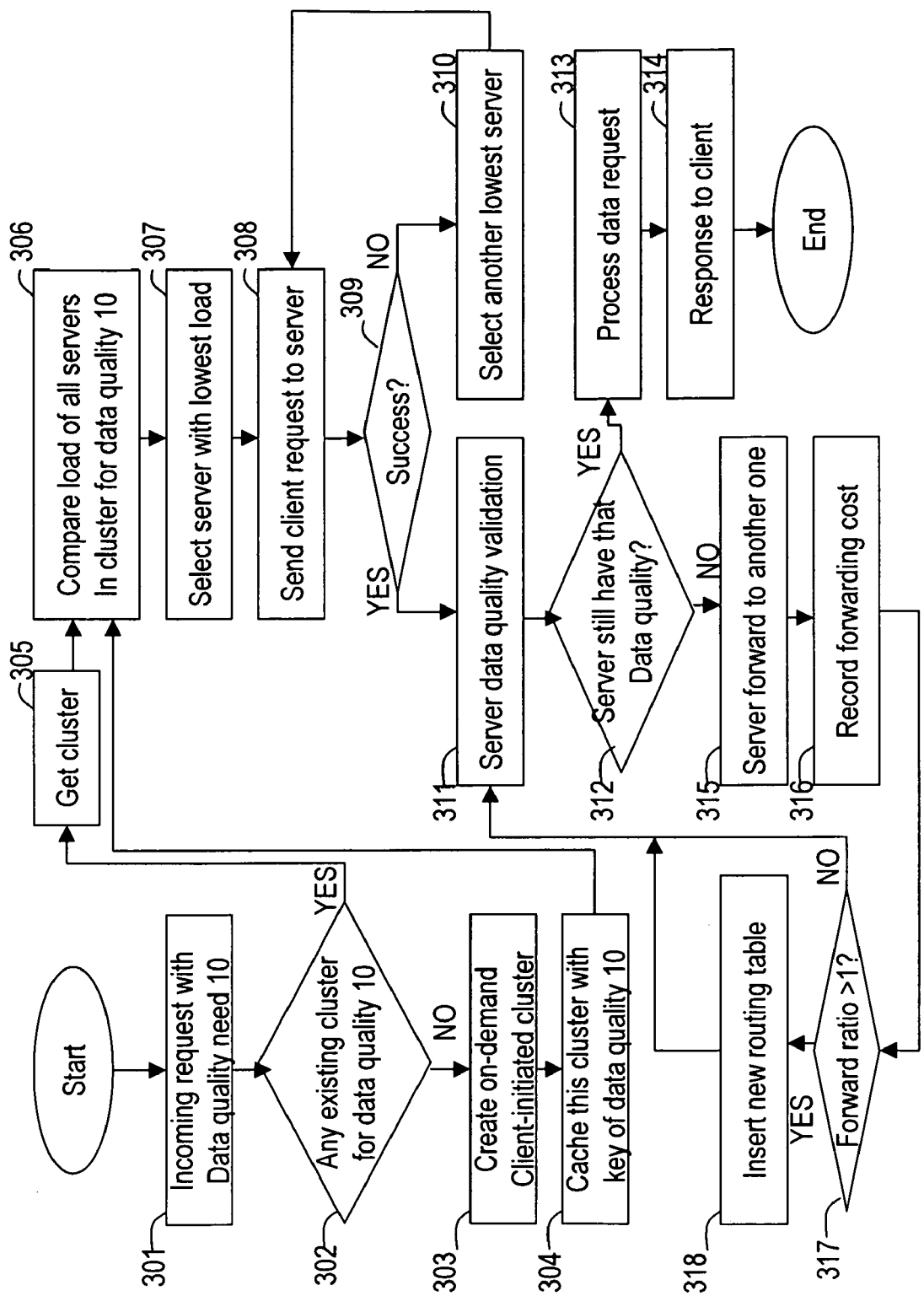
FIG. 3 is a flowchart showing how in one embodiment the present invention creates clusters and manages the workload of the servers in the clusters.

FIG. 3 is a flowchart showing how in one embodiment the present invention creates clusters and manages the workload of the servers in the clusters. When a client makes a request (state 301), the data quality requirement of this client is extracted from the client request. For example, a client may require a lag of no more than 10 transactions. The existing clusters are then examined to see whether there is an existing cluster that meets the data quality requirement of this client (state 302). If there exists such cluster, which, for example, was created by a similar request from a previous client, the information of this cluster is retrieved from the cache that stores the information of clusters (state 305). If no such cluster exists that meets the data quality requirement of this client, a new cluster is created that includes all servers that can meet the data quality requirement of this client (state 303), and this cluster is cached with the data quality as the key (state 304).

After creating (state 304) or retrieving (state 305) the cluster that meets the data quality requirement of this request, a workload management algorithm proceeds to select a server from the cluster to process the request. This selected server is the server that has the lowest workload among all servers that meet the data quality requirement of this client (state 307). Among all servers that meet the data quality requirement of the client, a server with a good data quality may belong to another cluster at the same time. For example, server 1 (101) in FIG. 2 belongs to clusters 201, 202 and 203. The workload management algorithm selects the server with the lowest workload, thus guaranteeing the best available data quality server is selected on condition of a balanced load. Once a selected server is identified, the client request is sent to the selected server (state 308). If the selected server is not available (state 309), the server that meets the data quality requirement of the client but with the next lowest workload is selected (state 309), and this process is repeated if necessary.

The data quality of a server may change between the time when the routing table based on which the routing decision is made is created and the time when the request is sent to the server for processing. Therefore, a server data quality validation is performed (state 311) to see whether there is a change on the data quality of the selected server. If server validation approves the data quality of the selected server (state 312), the client request is processed on the selected server (state 313), and the processing result is reported to the client (state 314). Otherwise, server will find another server that meets the data quality requirement of the client, and forward this client request to that server (state 315). The forwarding cost is calculated and recorded (state 316). If the forwarding ratio is larger than 1 (state 317), i.e. if the forwarding cost due to the stale routing table is larger than the cost for updating the routing table, the routing table is updated (state 318). The process then repeats from the step of performing a server data quality validation on the new selected server (state 311).

FIG. 4 shows the snapshots of the workloads of the servers, which illustrate how the workload management method works. The workload management method makes a routing decision based on the information of data quality and server workloads at the previous step, which, in one embodiment of the present invention, is brought back from the response stream of the last client request.

For example, in FIG. 4, row 1 of the table shows a snapshot of the server workloads of a previous client, whose response stream brings back information of the workloads, and data quality change after the select server processes the client request. The information will be used for the routing decision of the client 1 in row 2. Client 1 will also bring back the most current information on server workloads and data quality in its response stream, which will be used to route client 21 in row 3. In an alternate embodiment of the present invention, the information of the data quality and server workloads are not updated every time a request is processed, so as to improve efficiency and to reduce overheads. Instead, a counting mechanism is used to count how many forwardings are required to re-route a client request when the information of data quality and server workloads become stale. If the number of forwardings exceeds a preset threshold, the information of data quality and server workloads are plugged into the response stream of a client, and then the routing information are updated.

In FIG. 4, row 1 shows the initial transaction lags and server workloads of the servers. For example, server 1 has no lag and a workload of 60%, and server 4 has a lag of 6 transactions and a workload of 72%. In row 2, as client 1 needs a data quality of a lag of no more than 5 transactions (which is marked as client 1 (5) in FIG. 4), a cluster including server 1 and server 2 meets its data quality requirement. The server with the lowest load, namely, server 1, is selected to process the request from client 1. Consequently, the workload of server 1 goes up from 60% to 72% in row 2. The information of server workload and data quality of row 1 is used to decide the routing for the client 1 in row 2.

In row 3, client 21 needs the data quality of a lag of no more than 20 transactions. A new cluster of servers which includes servers 1-5 is created for providing this data quality (i.e. a lag of no more than 20 transactions). The server with the lowest load at moment, server 3, is selected for client 21. The workload of server 3 thus goes up to 68%.

Similar steps are repeated for clients 3, 4 and 5 in rows 4, 5 and 6, respectively. The present information of server workloads and data quality is used to select the next server to process the request from a client. Hence, workloads of servers are well balanced, and the data quality is guaranteed to meet the requirement of a client. The present invention selects the server with the best data quality for each client, which at least equals to the requirement of this client.

Please note that for simplifying the description, the examples in FIG. 4 assume that data qualities do not change over time, and only server workloads change with each transaction. As a person of ordinary skill in the art can contemplate, the present invention can also be applied when both server loads and data qualities change with the processing of each transaction. For example, server 2 may increase its transactions lag to 18 as a slow-down of replication occurs due to high network traffic, after the request from client 21 is processed. The present invention will automatically create a new dynamic asymmetric cluster that will exclude server 2 from the cluster of the data quality 5 (i.e. a cluster of servers with a lag of no more than 5 transactions).

One preferred embodiment of the present invention is described in detail with reference to FIG. 5 to FIG. 11.

Figure 5:
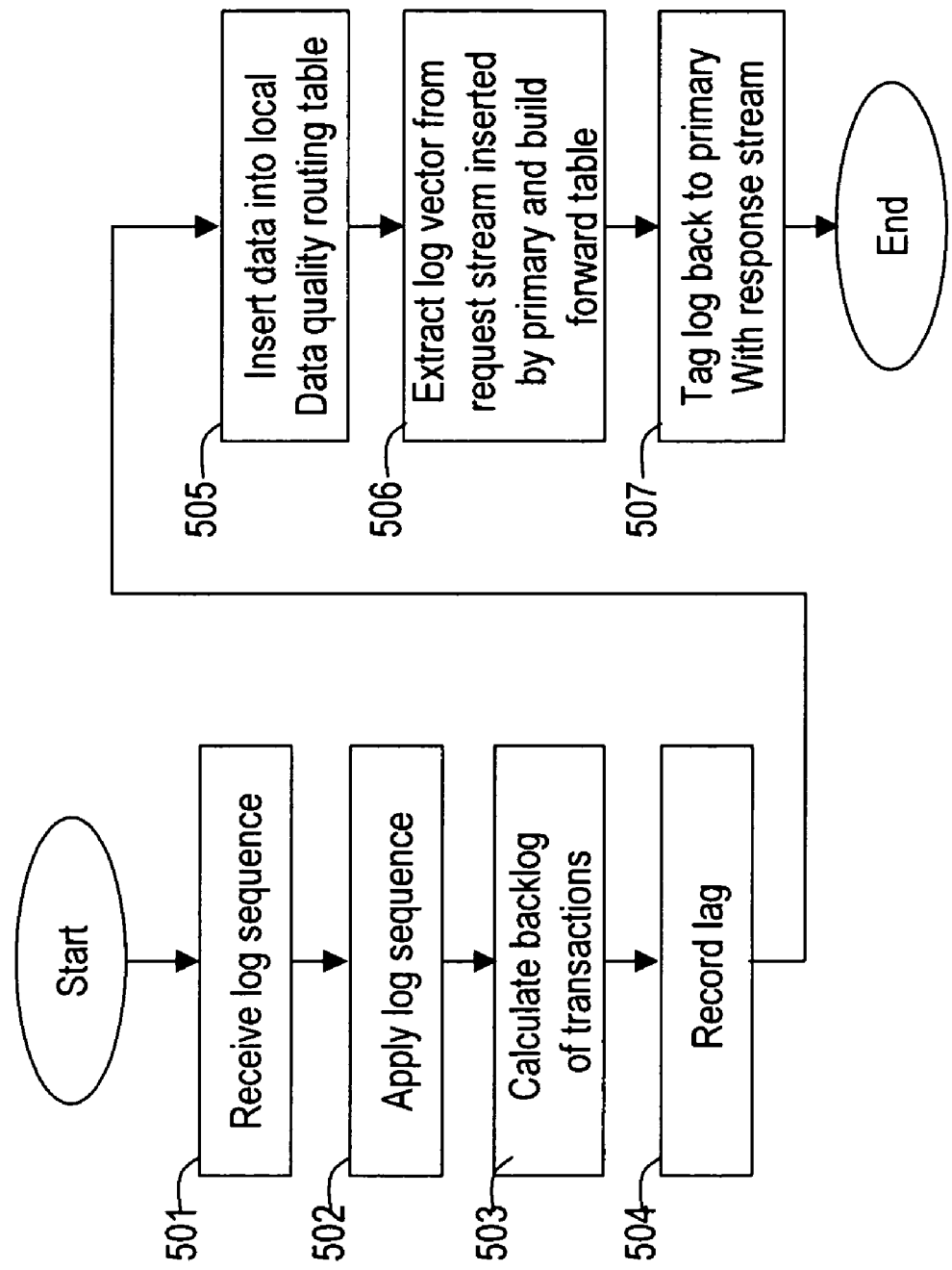
FIG. 5. is a flowchart illustrating how the present invention keeps track of the data quality of all servers.

FIG. 5. is a flowchart illustrating how the present invention keeps track of the data quality of all servers. It is implemented as a Data Quality Manager (DQM). For each replicated server of a data, a transaction that attempts to access the data is monitored, and a lag is calculated when a transaction is received or processed. The lag is plugged into the response stream so that the primary server can receive it. The primary server will build a vector of lags on all servers, and insert the vector into the request steam. Replicated servers extract the vector from the request steam and use it as a forwarding table, which is used to re-route requests. When a server verifies that it cannot meet the data quality requirement of an incoming data request, it will use the forwarding table to find another server that meets the data quality requirement, and forward this request to that server. It can be repeated recursively until the next available server is found.

As shown FIG. 5, after receiving a request, or a log sequence (state 501), a replicated server will process the request, or apply log sequence (state 502). A backlog of the transactions is calculated (state 503). The lag information is then recorded (state 504), and the information is inserted into a local data quality routing table (state 505). The replicated server will extract the log vector from the request stream that was inserted by the primary server, and uses the log vector to build a forwarding table if needed (state 506). The lag information will then be plugged in a response stream and sent back the primary server (state 507).

In a preferred embodiment of the present invention, a Request Context Extractor (RCE) is implemented to extract request context such as the service privileges of clients and request methods. For example, when the present invention is used in a stock trading system, a client with a higher service privilege will receive service of higher quality and with more current stock data (e.g. receive real-time stock information within 10 seconds). Or, a request of stock purchased will be serviced with higher quality and more current data, while a request of stock price inquiry can allow a delay of a few minutes and with stale stock prices. In different embodiments of the present invention, this context can be obtained from tag components, security principals, IIOP (Internet Inter-Orb Protocol) service contexts, or HTTP heads. In one embodiment of the present invention, a Policy Manager (PM) can be implemented to allow an administrator to dynamically set and change the policy of data services or priority. The administrator can use PM to configure the request context.

Figure 6:
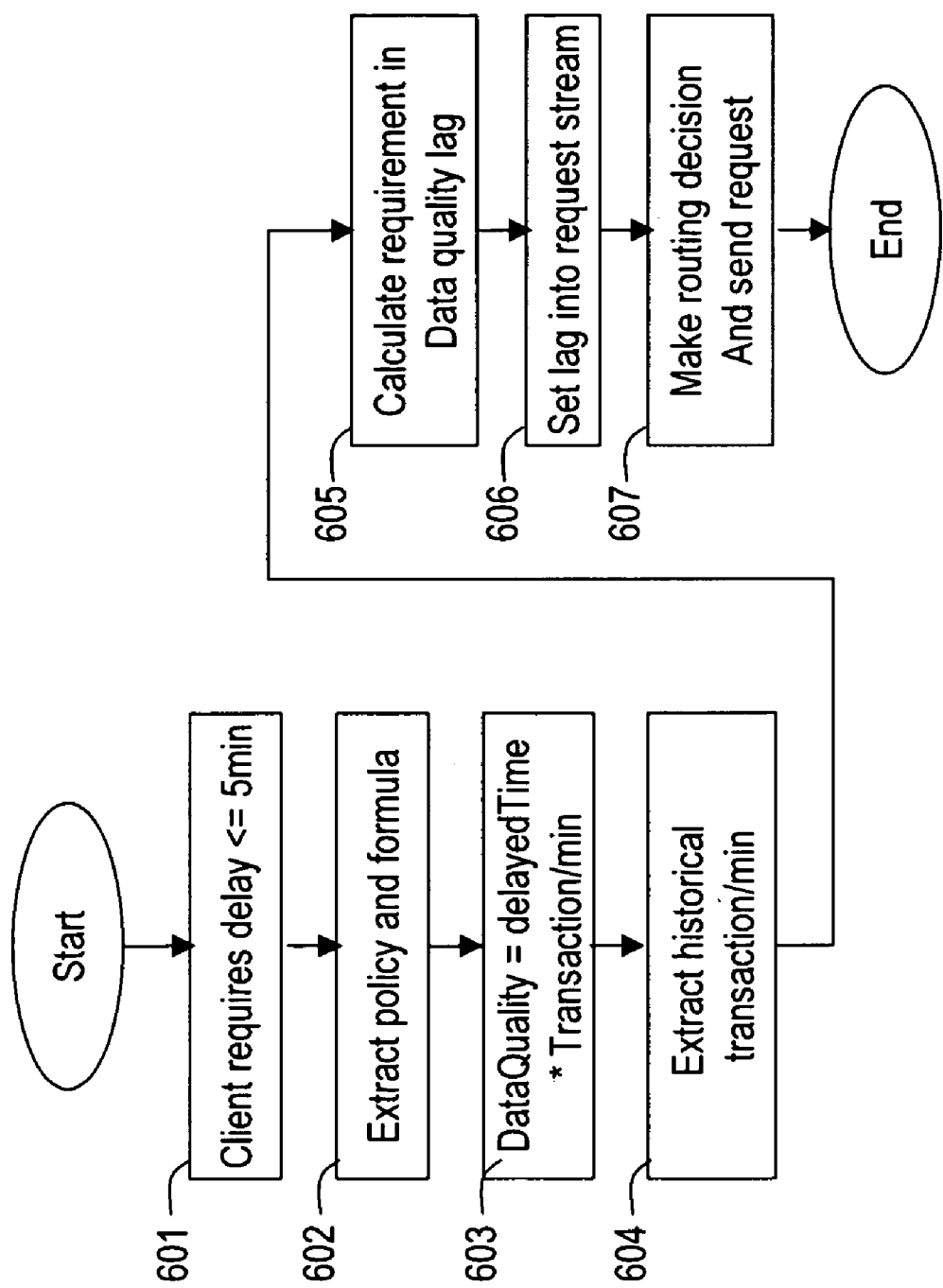
FIG. 6 is a flowchart showing how the Client Data-Quality Requirement Formalizer formalizes a client request context.

In a preferred embodiment of the present invention, a Client Data-Quality Requirement Formalizer (CDQRF) is implemented to formalize all client request contexts from the RCE or the PM into measurable integer that is compatible to the DQM. FIG. 6 is a flowchart showing how the CDQRF formalizes a client request context. When a client has a certain data quality requirement (state 601), for example, it requires a lag of no more than 5 minutes, policies regarding this client are retrieved from the PM (state 602). A formula is used to convert a time requirement from the client (e.g. no more than 5 minutes) into a lag measured by the number of transactions (state 603). In one embodiment, the formula used is lag=delayedTime*transactions/minute. A counter is implemented to extract the transactions/minute from the system. For example, the client requirement of a 5 minutes delay is converted to an equivalent lag of 5000 transactions, if the transactions/minute is measured to be 1000. After calculating the lag in the number of transactions (state 605), the lag is inserted into the request stream (state 606). Routing decisions can then be made, and the request is sent to the selected server (state 607). Although maximum time of lag is used as an example, other client request context can also be contemplated by a person of skill in the art to be formalized using the CDQRF.

In a preferred embodiment of the present invention, a Data-Quality Based Dynamic Re-Clustering (DQDRC) is implemented to perform dynamic server clustering. The DQDRC accepts a client request and creates a set of servers that can meet the data quality requirement of this client.

Figure 7:
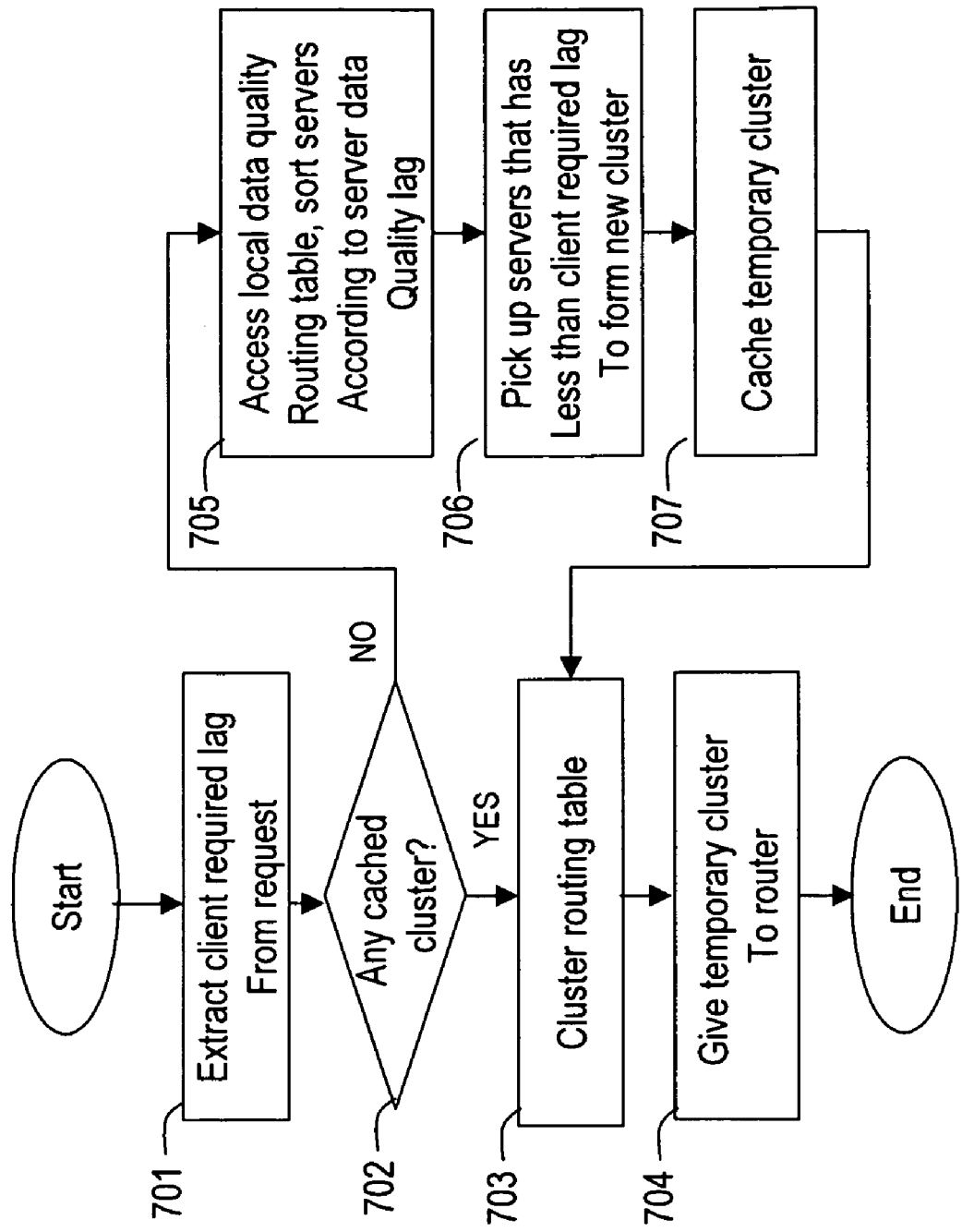
FIG. 7 is a flowchart illustrating how the data-quality based dynamic clustering is performed.

FIG. 7 is a flowchart illustrating how the data-quality based dynamic clustering is performed. In one embodiment, the system will first extract the data quality requirement of a client from a request stream (state 701), and try to find a cluster of servers that can provide the similar data quality (state 702). The cluster of servers may exist in the cache, if, for example, there was another client who had a similar data quality requirement. If no such cluster can be found in the cache, the local data quality routing table will be retrieved, and the servers will be sorted according to the data quality each server can provide (state 705). Servers that can provide a data quality that meets the data quality requirement of the client are then grouped to form a new cluster (state 706). This cluster is stored in the cache with its data quality as the key (state 707). This cluster will be added to the cluster routing table (state 703), and then given to the router (state 704), so that a client request can be routed to the selected server.

Figure 8:
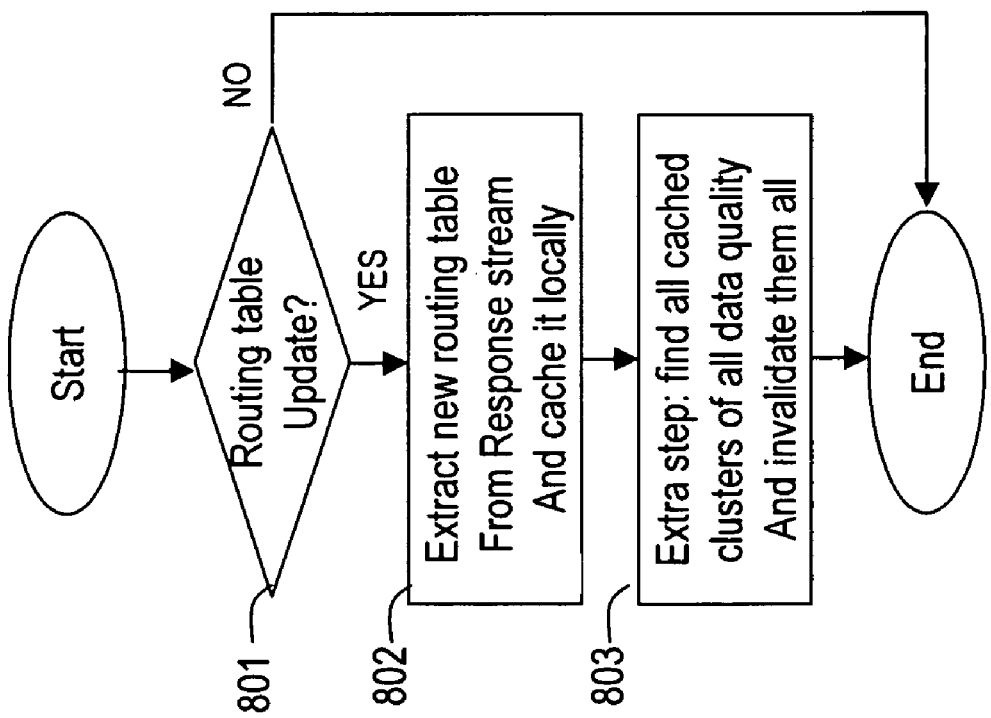
FIG. 8 shows the process of updating a routing table.

FIG. 8 shows the process of updating a routing table. If routing table updating is activated (state 801), new routing table will be extracted from the response stream, and stored locally for a server (state 802). The updating of the data quality routing table invalidates information of all clusters stored in the cache (state 803).

In a preferred embodiment of the present invention, a Dynamic Router (DR) is implemented to route a client request to a selected server in the cluster of servers grouped by DQDRC. This server can be selected as the one that meets the data quality requirement of the client, and with least CPU/Memory/IO usage.

Figure 9:
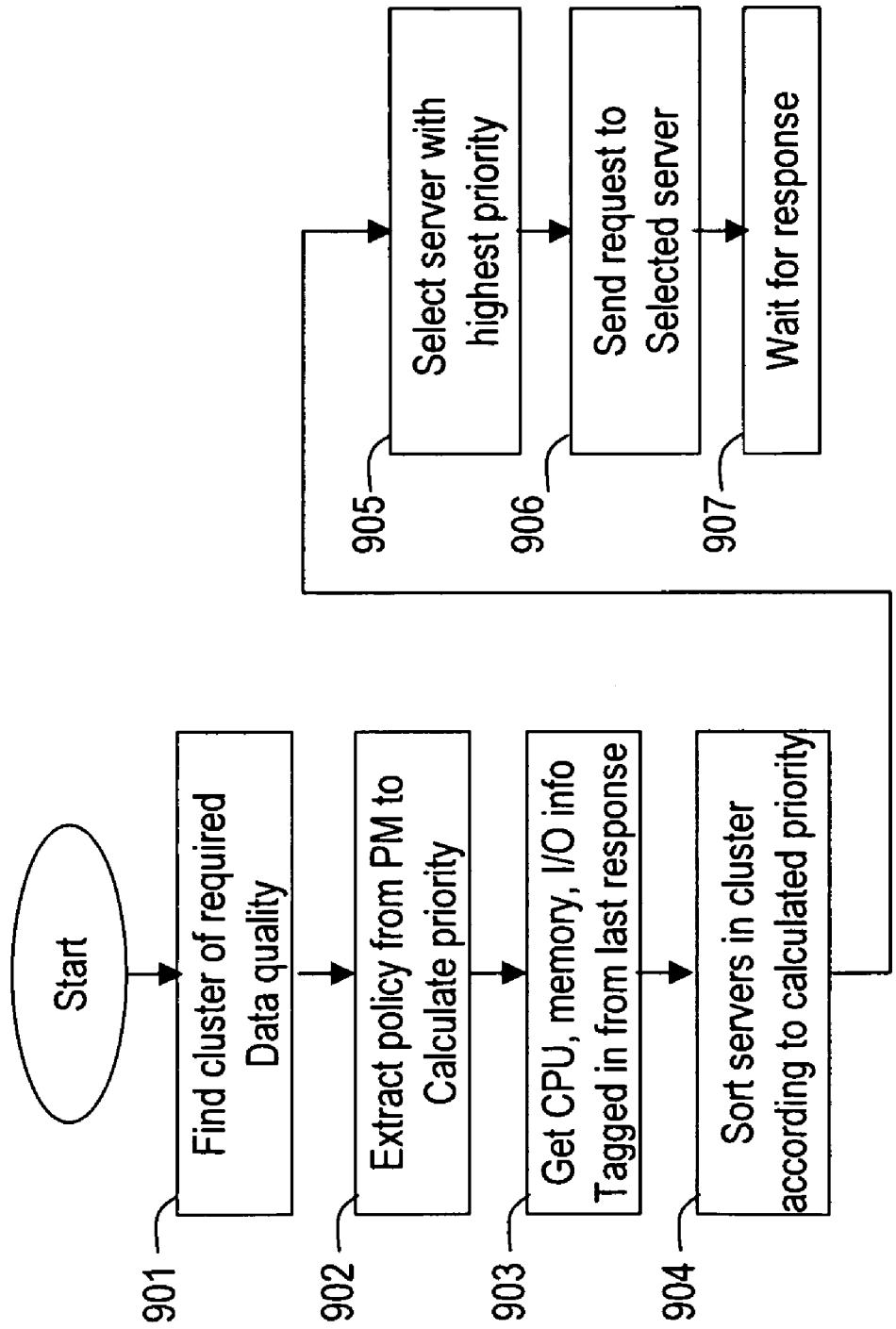
FIG. 9 is a flowchart that illustrates how a workload management method selects a server from the cluster of servers.

FIG. 9 is a flowchart that illustrates how a workload management method selects a server from the cluster of servers. First, a cluster of required data quality is created or retrieved by the DQDRC (state 901). Priority of the servers in the cluster is then calculated using the policies extracted by the PM (state 902), and the retrieved information regarding the usage of resources, such as CPU, memory or I/O usage (state 903). The servers in the clusters are then sorted according to their priority (state 904), and the server with the highest priority is selected (state 905). The client request is then sent to the selected server (state 906), and the request is processed and the response is returned to the client (state 907). The server is selected so as to balance the workloads of servers, and to avoid the overloading and overloading of these servers.

In a preferred embodiment of the present invention, a Data-Quality Based Request Forwarder (DQBRF) is used to check whether the data quality of the selected server still meets the requirement of a client request, after the selected server receives the request, and before the server process the request. If its data quality still meets the requirement of the client, the select server will process the request, and send the response to the client. Otherwise, the selected server will forward this client request to another server that can meet the data quality requirement of this client. This step ensures a client to always get the data with required level of data quality, and minimize the time window in which the data quality of a server may change.

Figure 10:
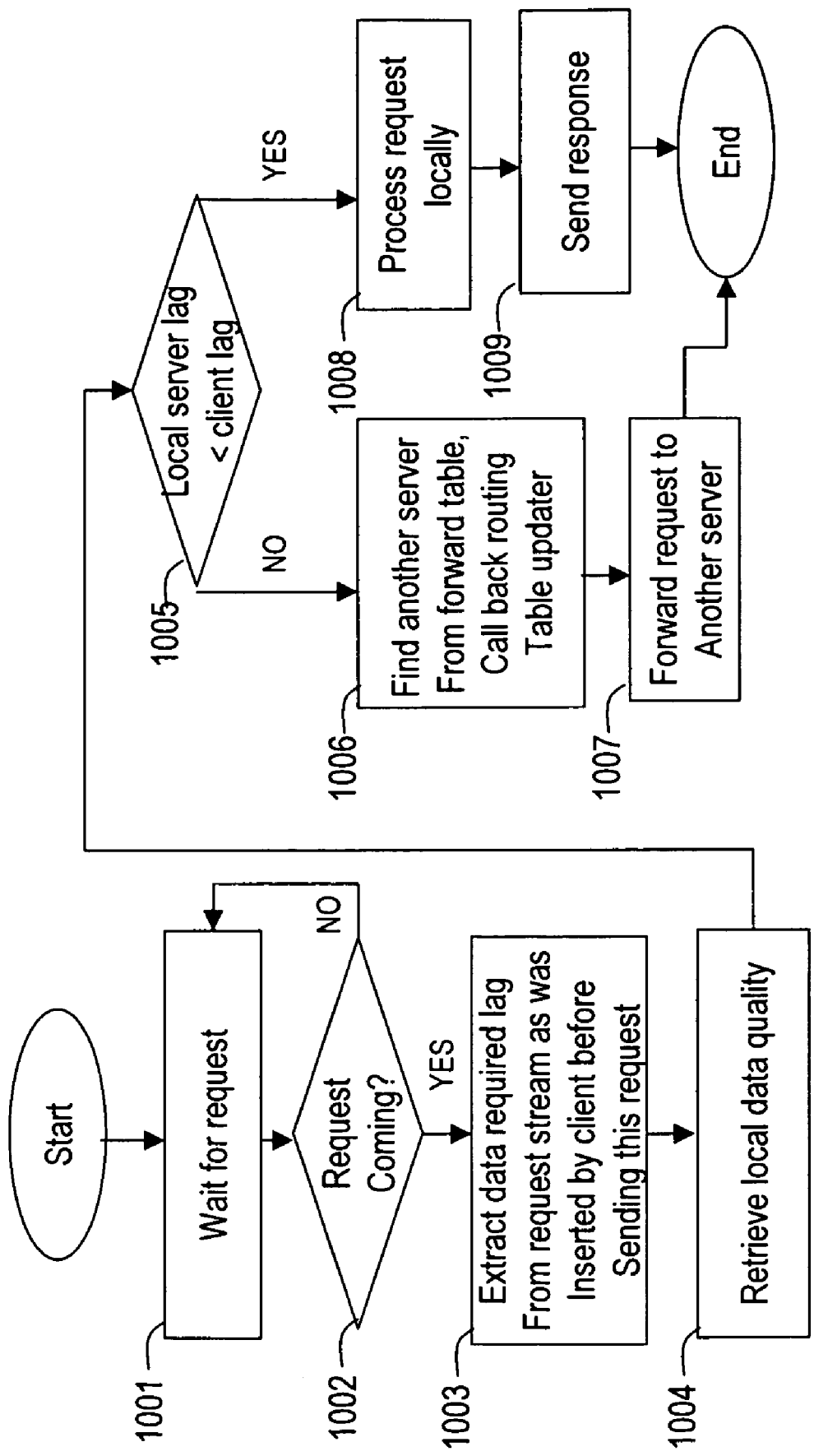
FIG. 10 illustrates how the Data-Quality Based Request Forwarder works to ensure the data quality.

FIG. 10 illustrates how the DQBRF works to ensure the data quality. The DQBRF awaits a request from a client (states 1001). When a request arrives (state 1002), the selected server does not process the request immediately. Instead, it verifies whether the server can still provide data of required data quality. The data quality requirement of the client is extracted from the request stream (state 1003). Local data quality of the server is then retrieved (state 1004). If the server can meet the data quality requirement of the client (state 1005), the requested will be processed by the server (state 1008), and processing result will be sent to the client (state 1009). Otherwise, another server will be selected using the forwarding table, and the routing table will be updated as illustrated in FIG. 8 (state 1006). The forwarding table is built by DOM, as described in FIG. 5. The request will then be sent to the new server (state 1007).

Figure 11:
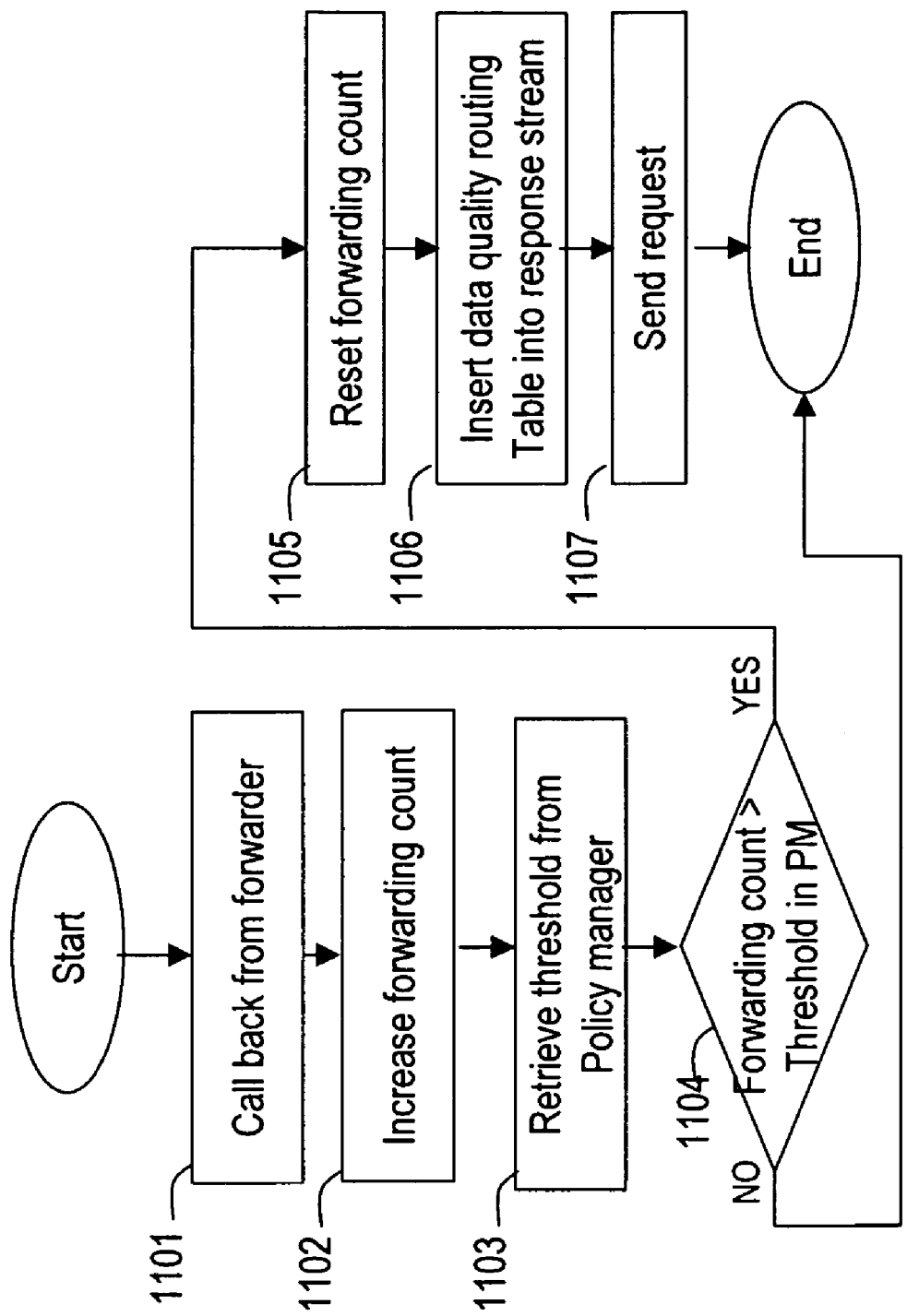
FIG. 11 illustrates how the data quality routing table updating is triggered.

Since the data quality of a server may change, routing tables are periodically updated to minimize the forwardings. FIG. 11 illustrates how the data quality routing table updating is triggered. Every time a selected server decides to forward a request, its data quality routing table becomes stale. When the number of forwarding exceeds the threshold that the administrator set in the PM, data quality routing table updating is triggered. As shown in FIG. 11, when the DQBRF is called (state 1101), the count of forwardings increases by 1 (state 1102). The forwarding threshold is retrieved (state 1103) and compared to the count of forwardings (state 1104). If the number of the forwardings is larger than the forwarding threshold, the count of forwarding is cleared (state 1105), and the data quality routing table is inserted into the response stream to the client (state 1106). When the client gets the response from the server, the clients will check whether the response from the server carries any new data quality routing table. If it carries a new data quality routing table, the data quality routing table will be extracted and stored on the client side.

Figure 12:
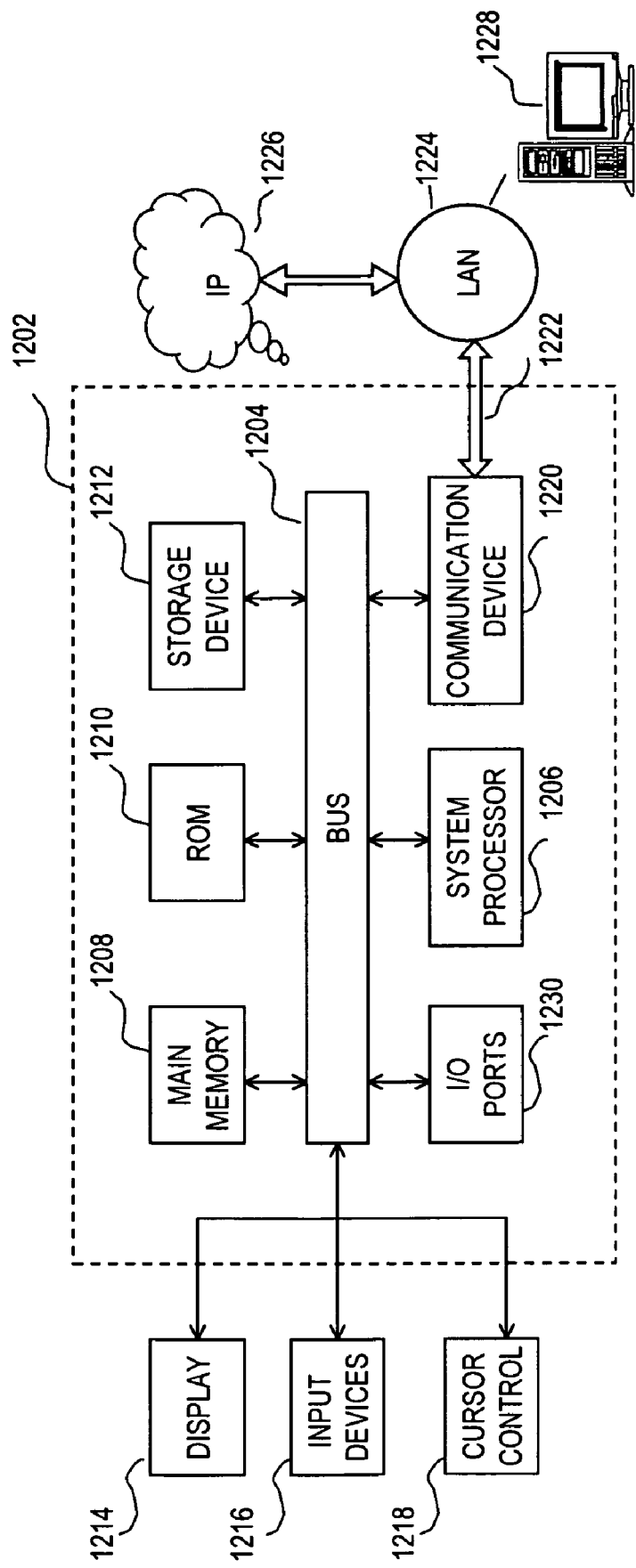
FIG. 12 is a conceptual diagram of a computer system that the present invention can be utilized.

FIG. 12 illustrates a computer system (1202) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (1204) or other communication mechanism for communicating information and a processor (1206) coupled with bus (1204) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (1206). In addition, main memory (1208) may be used for storing temporary variables or other intermediate information during execution of instructions to be executed by processor. The computer system further includes a read only memory (ROM) 1210 or other static storage device (e.g., programmable ROM (PROM), erasable PROM (EPROM), and electrically erasable PROM (EEPROM)) coupled to bus 1204 for storing static information and instructions for processor. A storage device (1212), such as a magnetic disk or optical disk, is provided and coupled to bus for storing information and instructions. This storage device is an example of a computer readable medium.

The computer system also includes input/output ports (1230) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-FIG. 4. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (1214), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (1216) and a cursor control (1218), for communicating information and command selections to processor (1206). Such command selections can be implemented via voice recognition hardware and/or software functioning as the input devices (1216). The cursor control (1218), for example, is a mouse, a trackball, cursor direction keys, touch screen display, optical character recognition hardware and/or software, etc., for communicating direction information and command selections to processor (1206) and for controlling cursor movement on the display (1214). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (1220) provides a two-way data communication coupling to a network link (1222) that may be connected to, for example, a local network (1224). For example, the communication interface (1220) may be a network interface card to attach to any packet switched local area network (LAN). As another example, the communication interface (1220) may be an asymmetrical digital subscriber line (ADSL) card, an integrated services digital network (ISDN) card or a modem to provide a data communication connection to a corresponding type of telephone line. Wireless links may also be implemented via the communication interface (1220). In any such implementation, the communication interface (1220) sends and receives electrical, electromagnetic or optical signals that carry digital data streams representing various types of information.

Network link (1222) typically provides data communication through one or more networks to other data devices. For example, the network link may provide a connection to a computer (1226) through local network (1224) (e.g., a LAN) or through equipment operated by a service provider, which provides communication services through a communications network (1228). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for selecting a target data server from a plurality of data servers in an information system to service a request of a client with a data quality requirement, comprising:
   determining a formalized data quality of the client using the data quality requirement, wherein the determining comprises:
      extracting the data quality requirement of the client from the request;
      extracting policies for the request of the client;
      retrieving a conversion measure for converting the data quality requirement to the formalized data quality;
      calculating the formalized data quality with a given formula using the policies, the conversion measure, and the data quality requirement of the client;
      and setting the formalized data quality in a request stream of the client;
   using the formalized data quality of the client, finding a cluster of data servers from the plurality of data servers that can meet the data quality requirement of the client;
   choosing a select data server from the cluster of data servers;
   verifying if the select data server can still meet the data quality requirement of the client, and
      if so, selecting the select data server as the target data server for processing the request, and
      if not, selecting another data server as the target data server for processing the request.

2. The method of claim 1, wherein the policies comprises rules to determine the formalized data quality according to a service privilege or a request method of the client.

3. The method of claim 1, wherein the conversion measure is a transactions/minute, and the given formula is "the formalized data quality"="the data quality requirement of the client"*"the transactions/minute".

4. The method of claim 1, wherein the finding comprises:
   searching a cache of the information system for an existing cluster with a key equals to the formalized data quality of the client;
   if the existing cluster is found in the cache, using the existing cluster as the cluster of data servers that can meet the data quality requirement of the client; and
   if no existing cluster with the key is found in the cache, forming the cluster of data servers that can meet the data quality requirement of the client.

5. The method of claim 4, wherein the forming comprises:
   accessing a data quality routing table;
   sorting the data servers according to a current data quality of each of the data servers;
   grouping data servers whose current data quality is better than the formalized data quality of the client into a new cluster;
   using the new cluster as the cluster of data servers that can meet the data quality requirement of the client; and
   storing the new cluster in the cache using the formalized data quality as its key.

6. The method of claim 1, wherein the choosing comprises:
   extracting policies for the request of the client;
   retrieving resource consumption information, which measures a consumption of computing resources, for each of the data servers in the cluster;
   calculating a priority value for each of the data servers in the cluster using the policies and the resource consumption information;
   sorting the data servers in the cluster according to the priority value of each of the data servers; and
   selecting the server with the highest priority value.

7. The method of claim 1, wherein the verifying and selecting comprise:
   retrieving a formalized data quality of the selected server;
   comparing the formalized data quality of the client to the formalized data quality of the selected server;
   if the formalized data quality of the selected server is better than the formalized data quality of the client, using the selected server as the target server; and
   if the formalized data quality of the selected server is not better than the formalized data quality of the client, using a next server in a routing table as the target server.

8. The method of claim 7, further comprises building the routing table before using the routing table to find the target server.

9. The method of claim 7, further comprises updating the routing table after the next server is used as the target server.

10. The method of claim 9, wherein the updating comprises:
   implementing a counting mechanism to count a number of forwardings;
   comparing the number of forwardings to a preset forward threshold;
   if the number of forwardings reaches the forward threshold, extracting a new routing table from a response stream; and
   clearing the counting mechanism by setting the number of forwarding to zero.

11. The method of claim 10, further comprises invalidating information on clusters in the cache.

12. A computer program product for selecting a target data server from a plurality of data servers in an information system to service a request of a client with a data quality requirement, the computer program product comprising:

a non-transitory computer usable medium having computer usable program code embodied therewith, the computer usable program code comprising:
instructions to determine a formalized data quality of the client using the data quality requirement, the instructions to determine further comprising, instructions to extract the data quality requirement of the client from the request;
instructions to extract policies for the request of the client;
instructions to retrieve a conversion measure for converting the data quality requirement to the formalized data quality;
instructions to calculate the formalized data quality with a given formula using the policies, the conversion measure, and the data quality requirement of the client; and
instructions to set the formalized data quality in a request stream of the client;
instructions to find a cluster of data servers from the plurality of data servers that can meet the data quality requirement of the client, using the formalized data quality of the client;
instructions to choose a select server from the cluster of data servers;
instructions to verify if the select data server can still meet the data quality requirement of the client, and
if so, to select the select data server as the target data server for processing the request, and
if not, to select another data server as the target data server for processing the request.

13. The computer program product of claim 12, wherein the policies comprise rules to determine the formalized data quality according to a service privilege or a request method of the client.

14. The computer program product of claim 12, wherein the conversion measure is a transactions/minute, and the given formula is "the formalized data quality"="the data quality requirement of the client"*"the transactions/minute".

15. The computer program product of claim 12, wherein the instructions to find comprise:
instructions to search a cache of the information system for an existing cluster with a key equals to the formalized data quality of the client;
if the existing cluster is found in the cache, instructions to use the existing cluster as the cluster of data servers that can meet the data quality requirement of the client; and
if no existing cluster with the key is found in the cache, instructions to form the cluster of data servers that can meet the data quality requirement of the client.

16. The computer program product of claim 15, wherein the instructions to form comprise:
instructions to access a data quality routing table;
instructions to sort the data servers according to a current data quality of each of the data servers;
instructions to group data servers whose current data quality is better than the formalized data quality of the client into a new cluster;
instructions to use the new cluster as the cluster of data servers that can meet the data quality requirement of the client; and
instructions to store the new cluster in the cache using the formalized data quality as its key.

17. The computer program product of claim 12, wherein the instructions to choose comprise:
instructions to extract policies for the request of the client;
instructions to retrieve resource consumption information, which measures a consumption of computing resources, for each of the data servers in the cluster;
instructions to calculate a priority value for each of the data servers in the cluster using the policies and the resource consumption information;
instructions to sort the data servers in the cluster according to the priority value of each of the data servers; and
instructions to select the server with the highest priority value.

18. The computer program product of claim 12, wherein the instructions to verify and to select comprise:
instructions to retrieve a formalized data quality of the selected server;
instructions to compare the formalized data quality of the client to the formalized data quality of the selected server;
if the formalized data quality of the selected server is better than the formalized data quality of the client, instructions to use the selected server as the target server; and
if the formalized data quality of the selected server is not better than the formalized data quality of the client, instructions to use a next server in a routing table as the target server.

19. The computer program product of claim 18, further comprises instructions to build the routing table before using the routing table to find the target server.

20. The computer program product of claim 18, further comprises instructions to update the routing table after the next server is used as the target server.

21. The computer program product of claim 20, wherein the instructions to update comprise:
instructions to implement a counting mechanism to count a number of forwadings;
instructions to compare the number of forwardings to a preset forward threshold;
if the number of forwardings reaches the forward threshold, instructions to extract a new routing table from a response stream; and
instructions to clear the counting mechanism by setting the number of forwarding to zero.

22. The computer program product of claim 21, further comprises instructions to invalidate information on clusters in the cache.

23. A computer system comprising:
a processor;
a memory operatively coupled with the processor;
a storage device operatively coupled with the processor and the memory; and
a computer program product for selecting a target data server from a plurality of data servers in an information system to service a request of a client with a data quality requirement, the computer program product comprising:
a computer usable medium having computer usable program code embodied therewith, the computer usable program code comprising:
instructions to determine a formalized data quality of the client using the data quality requirement, the instructions to determine further comprising, instructions to extract the data quality requirement of the client from the request;

instructions to extract policies for the request of the client;

instructions to retrieve a conversion measure for converting the data quality requirement to the formalized data quality;

instructions to calculate the formalized data quality with a given formula using the policies, the conversion measure, and the data quality requirement of the client; and instructions to set the formalized data quality in a request stream of the client;

instructions to find a cluster of data servers from the plurality of data servers that can meet the data quality requirement of the client, using the formalized data quality of the client;

instructions to choose a select server from the cluster of data servers;

instructions to verify if the select data server can still meet the data quality requirement of the client, and if so, to select the select data server as the target data server for processing the request, and if not, to select another data server as the target data server for processing the request.

* * * * *